United States Patent
Katayama et al.

(10) Patent No.: US 10,143,014 B2
(45) Date of Patent: Nov. 27, 2018

(54) CONTROL DEVICE AND COMMUNICATION SYSTEM

(71) Applicant: FUJITSU COMPONENT LIMITED, Tokyo (JP)

(72) Inventors: Shinichi Katayama, Tokyo (JP); Naoyuki Nagao, Tokyo (JP); Mitsuru Kobayashi, Tokyo (JP); Tatsuya Odajima, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 228 days.

(21) Appl. No.: 14/682,459

(22) Filed: Apr. 9, 2015

(65) Prior Publication Data
US 2015/0304884 A1     Oct. 22, 2015

(30) Foreign Application Priority Data

Apr. 22, 2014 (JP) ................................. 2014-088460

(51) Int. Cl.
*H04W 28/04* (2009.01)
*H04W 74/08* (2009.01)
(Continued)

(52) U.S. Cl.
CPC ..... *H04W 74/085* (2013.01); *H04W 56/0015* (2013.01); *H04W 74/04* (2013.01); *H04W 84/12* (2013.01); *H04W 84/20* (2013.01)

(58) Field of Classification Search
CPC .......... H04W 28/044; H04W 56/0015; H04W 84/12; H04W 84/20; H04W 74/04; H04W 74/085
(Continued)

(56) References Cited

U.S. PATENT DOCUMENTS

| 4,635,195 A | 1/1987 | Jeppesen, III et al. |
| 6,069,871 A * | 5/2000 | Sharma ................ H04B 7/2628 370/209 |

(Continued)

FOREIGN PATENT DOCUMENTS

| JP | 62-500269 | 1/1987 |
| JP | 6-112960 | 4/1994 |

(Continued)

OTHER PUBLICATIONS

Patent Abstracts of Japan, Publication No. 6-112960, published Apr. 22, 1994.
(Continued)

*Primary Examiner* — Un C Cho
*Assistant Examiner* — Shah M Rahman
(74) *Attorney, Agent, or Firm* — Staas & Halsey LLP

(57) ABSTRACT

A control device that performs wireless communication and is connected to another control device via a wired network includes: an acquirer that acquires information relating to a channel and a communication timing used for wireless communication via the wired network from another control device that acts as a slave; a generator that generates a setting of a channel and a communication timing in which wireless communication performed by the another control device is free of interference, based on information relating to a channel and a communication timing used for wireless communication of the control device and information relating to the channel and the communication timing used for the wireless communication that are acquired by the acquirer; and a reporter that reports the setting of the channel and the timing generated by the generator to the another control device that acts as the slave via the wired network.

9 Claims, 14 Drawing Sheets

(51) Int. Cl.
  *H04W 56/00* (2009.01)
  *H04W 84/12* (2009.01)
  *H04W 84/20* (2009.01)
  *H04W 74/04* (2009.01)

(58) Field of Classification Search
  USPC .......................................................... 370/338
  See application file for complete search history.

(56) References Cited

U.S. PATENT DOCUMENTS

| | | | | |
|---|---|---|---|---|
| 6,070,077 | A * | 5/2000 | Kim ...................... | H04W 88/08 455/452.2 |
| 7,643,823 | B2 * | 1/2010 | Shamoon ............... | G01D 21/00 455/419 |
| 7,818,480 | B2 * | 10/2010 | Hoerl ...................... | G06F 3/023 345/158 |
| 8,442,002 | B2 * | 5/2013 | Zhou ...................... | H04L 5/0037 370/330 |
| 2003/0224812 | A1 | 12/2003 | Gassho et al. | |
| 2005/0111484 | A1 * | 5/2005 | Obata ..................... | H04W 88/08 370/465 |
| 2007/0155431 | A1 * | 7/2007 | Munzner ............ | H04W 72/0406 455/560 |
| 2008/0253351 | A1 * | 10/2008 | Pernu ..................... | H04W 88/06 370/345 |
| 2009/0073947 | A1 | 3/2009 | Fantaske | |
| 2010/0327766 | A1 * | 12/2010 | Recker ...................... | H02J 9/02 315/291 |
| 2011/0198926 | A1 * | 8/2011 | Xu .......................... | H02M 1/44 307/38 |
| 2011/0199960 | A1 | 8/2011 | Fukuzawa et al. | |
| 2012/0243638 | A1 | 9/2012 | Maltsev et al. | |
| 2013/0077521 | A1 * | 3/2013 | Feng .................. | H04W 36/0083 370/252 |
| 2013/0115965 | A1 * | 5/2013 | Xu ........................ | H04W 72/04 455/450 |
| 2013/0249429 | A1 * | 9/2013 | Woytowitz ......... | H05B 37/0263 315/246 |
| 2013/0264971 | A1 * | 10/2013 | Yeh ..................... | H05B 37/0254 315/312 |
| 2013/0272275 | A1 | 10/2013 | Yu | |
| 2014/0029531 | A1 * | 1/2014 | Chang .................. | H04W 16/14 370/329 |
| 2014/0133333 | A1 * | 5/2014 | Liu ........................ | H04W 24/10 370/252 |
| 2014/0163751 | A1 * | 6/2014 | Davis ..................... | H04L 12/12 700/286 |
| 2014/0192757 | A1 * | 7/2014 | Lee ........................ | H04L 1/1861 370/329 |
| 2015/0035682 | A1 | 2/2015 | Sasaki et al. | |

FOREIGN PATENT DOCUMENTS

| | | | | |
|---|---|---|---|---|
| JP | 2003-298591 | | 10/2003 | |
| JP | 2004260382 | A * | 9/2004 | ............... H04L 7/00 |
| JP | 2005-78174 | | 3/2005 | |
| JP | 2007053627 | A * | 3/2007 | ............... H04L 7/00 |
| JP | 2010-136351 | | 6/2010 | |
| JP | 2013-168791 | | 8/2013 | |
| JP | 2013168791 | A * | 8/2013 | ............ H04W 72/08 |
| JP | 2013-541865 | | 11/2013 | |
| KR | 20150102174 | A * | 9/2015 | ............ H05B 37/22 |
| WO | 2013/128902 | | 9/2013 | |

OTHER PUBLICATIONS

Patent Abstracts of Japan, Publication No. 2005-78174, published Mar. 24, 2005.
Extended European Search Report dated Sep. 21, 2015 in corresponding European Patent Application No. 15164331.9.
Chinese Office Action dated Jul. 3, 2017 in related Chinese Application No. 201510191775.6.
Japanese Office Action dated Feb. 27, 2018 in related Japanese Patent Application No. 2014-088460.

\* cited by examiner

FIG. 6

| CONTROL DEVICE | IP ADDRESS | MANAGING POWER SOURCE CONTROL DEVICE | GROUP ID |
|---|---|---|---|
| 14A (MASTER) | 192.168.1.11 | 16A | g0003 |
| 14B (SLAVE) | 192.168.1.12 | 16B | g0001 |
| 14C (SLAVE) | 192.168.1.13 | 16C | g0001 |
| 14D (SLAVE) | 192.168.1.14 | 16D | g0002 |
| 14E (SLAVE) | 192.168.1.15 | 16E | g0002 |

FIG. 9

| CONTROL DEVICE | CHANNEL | STARTING TIME | CYCLE |
|---|---|---|---|
| 14A (MASTER) | 1 | 5 | 10 |
| 14B (SLAVE) | 2 | 5 | 10 |
| 14C (SLAVE) | 3 | 5 | 10 |
| 14D (SLAVE) | 4 | 5 | 10 |
| 14E (SLAVE) | 1 | 10 | 10 |

FIG. 11

| < ACQUIRED TIME >, | < ELECTRICAL POWER INFORMATION [W]>, |
|---|---|
| 2014/1/7 00:00:05, | 30, |
| 2014/1/7 00:00:15, | 33, |
| 2014/1/7 00:00:25, | 35, |
| 2014/1/7 00:00:35, | 29, |
| 2014/1/7 00:00:45, | 32, |

FIG. 12

| ACQUIRED TIME | INFORMATION OF 14A [W] | INFORMATION OF 14B [W] |
|---|---|---|
| 2014/1/7 00:00:05, | 30, | 45, |
| 2014/1/7 00:00:15, | 33, | 43, |
| 2014/1/7 00:00:25, | 35, | 42, |
| 2014/1/7 00:00:35, | 29, | 45, |
| 2014/1/7 00:00:45, | 32, | 41, |

US 10,143,014 B2

CONTROL DEVICE AND COMMUNICATION SYSTEM

CROSS-REFERENCE TO RELATED APPLICATION

This application is based upon and claims the benefit of priority of the prior Japanese Patent Application No. 2014-088460 filed on Apr. 22, 2014, the entire contents of which are incorporated herein by reference.

FIELD

A certain aspect of the embodiments is related to a control device and a communication system.

BACKGROUND

Conventionally, there is known a power source control network in which a master logical device and a slave logical device are connected to each other (for example, see Japanese Laid-open Patent Publication No. 62-500269). On the network, all of communication is performed between the master logical device and the slave logical device.

There is known a technology in which a client device having a power source control device is connected to a LAN (Local Area Network) together with a host computer (for example, see Japanese Laid-open Patent Publication No. 6-112960). Moreover, there is known a technology in which one of servers that are connected to an uninterruptible power source via communication cables is determined as a master server, the others are determined as slave servers, and a shut-down instruction is sent to the slave servers when the master server detects a power source abnormity of the uninterruptible power source (for example, see Japanese Laid-open Patent Publication No. 2005-78174).

SUMMARY

According to an aspect of the present invention, there is provided a control device that performs wireless communication and is connected to another control device via a wired network including: an acquirer that acquires information relating to a channel and a communication timing used for wireless communication via the wired network from another control device that is made to act as a slave; a generator that generates a setting of a channel and a communication timing in which wireless communication performed by the another control device is free of interference, based on information relating to a channel and a communication timing used for wireless communication of the control device and information relating to the channel and the communication timing used for the wireless communication that are acquired by the acquirer; and a reporter that reports the setting of the channel and the timing generated by the generator to the another control device that is made to act as the slave via the wired network.

According to an aspect of the present invention, there is provided a communication system including: a plurality of control devices that are connected to each other via a wired network; a plurality of opposing control devices that respectively perform wireless communication with the plurality of control devices; and an information processing device that is connected to the plurality of control devices via the wired network, and includes a setter that makes one of the plurality of control devices act as a master and makes the other control devices act as a slave, wherein: the master includes: an acquirer that acquires information relating to a channel and a communication timing used for a wireless communication via the wired network from the slave; a generator that generates a setting of a channel and a communication timing that is free of interference in the wireless communication between the plurality of control devices and the plurality of opposing control devices, based on information relating to a channel and a communication timing used for a wireless communication that the master uses and information relating to the channel and the communication timing used for the wireless communication that are acquired by the acquirer; and a reporter that reports the setting of the channel and the communication timing generated by the generator to the slave via the wired network, the slave includes a changer that changes a channel and a communication timing used for the wireless communication of the slave in accordance with the setting of the channel and the communication that are reported by the reporter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates a relationship between a control device, an IP address, a power source control device and an ID of a group to which the power source control device belongs;

FIG. 9 illustrates an example free of interference of wireless communication;

FIG. 11 illustrates an example of electrical power information and an acquired time;

FIG. 12 illustrates an example of a format of electrical information;

DESCRIPTION OF EMBODIMENTS

Figure 1:
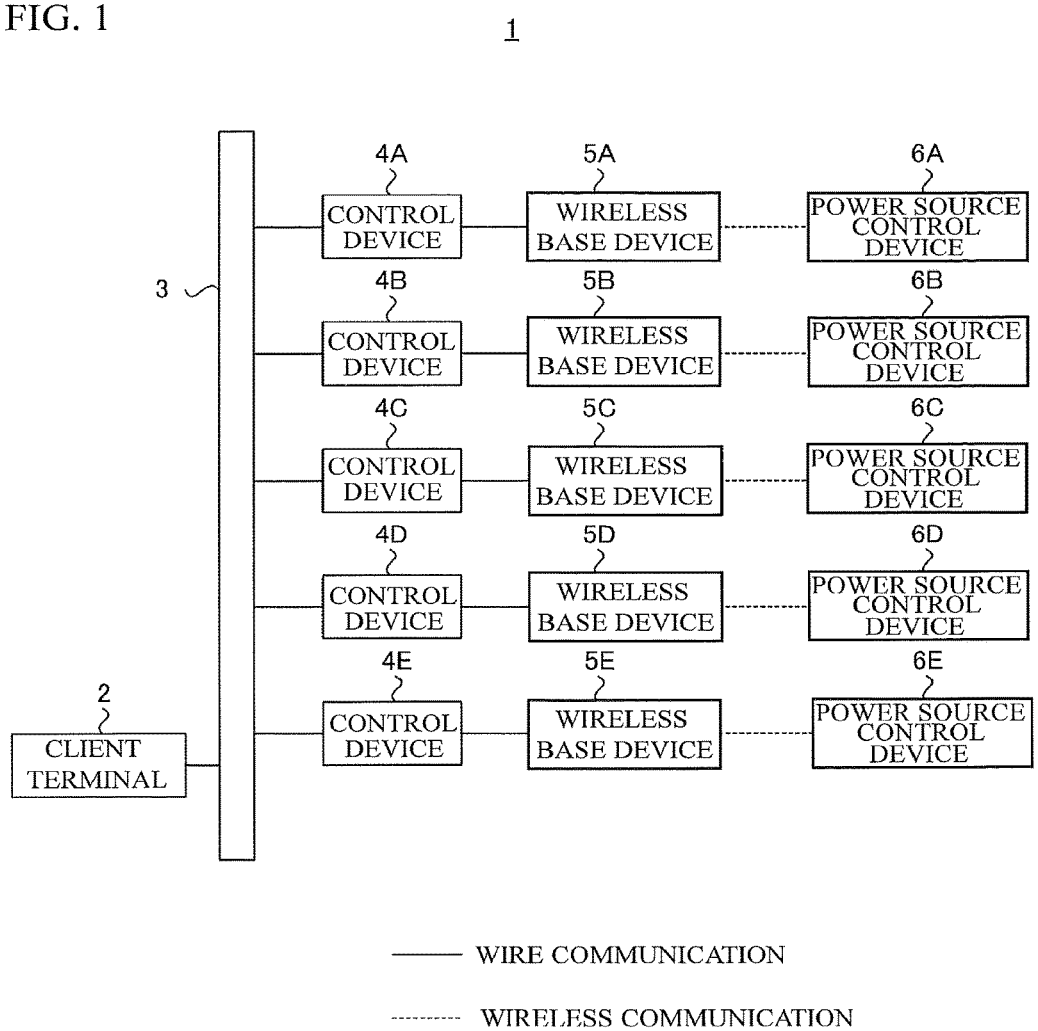
FIG. 1 illustrates a structure diagram of a conventional communication system.

FIG. 1 illustrates an example of a communication system 1 that has a client terminal 2, control devices 4A to 4E, wireless base devices 5A to 5E, and power source control devices 6A to 6E. There is known a communication system 1 that has a client terminal 2, control devices 4A to 4E, wireless base devices 5A to 5E, and power source control devices 6A to 6E, as illustrated in FIG. 1. In the communication system 1, the client terminal 2 is connected to the control devices 4A to 4E via a wired network 3. The control devices 4A to 4E are respectively connected to the wireless base devices 5A to 5E. The wireless base devices 5A to 5E are respectively connected to the power source control devices 6A to 6E via wireless communication. The wireless base devices 5A to 5E respectively communicate with the power source control devices 6A to 6E with respect to electrical power information without wires. The electrical power information acquired by the power source control devices 6A to 6E are respectively stored in the control devices 4A to 4E via the wireless base devices 5A to 5E.

In the communication system 1 of FIG. 1, when a plurality of wireless communication is performed between the wireless base devices and the power source control devices with an identical channel and communication timings of the plurality of wireless communication are identical, collisions of the wireless communication may occur. In order to prevent the collisions of the wireless communication, it is necessary for a user to distribute the communication channels and the communication timings. Therefore, the user has to study combinations of the wireless communication and set the communication channels and the communication timings. Accordingly, there is a problem that the user has heavy workload.

In the communication system 1 of FIG. 1, the user can browse the electrical power information acquired by the power source control devices 6A to 6E by accessing the control devices 4A to 4E via the client terminal 2. However, when the user wants to browse the electrical power information acquired by a specific power source control device, the user has to understand control devices that are connected to the specific power source control device. That is, there is a problem that the user has to understand connection relationships between the power source control devices and the control devices and thereby the user has heavy workload.

A description will now be given of an embodiment of the present invention with reference to the drawings.

Figure 2:
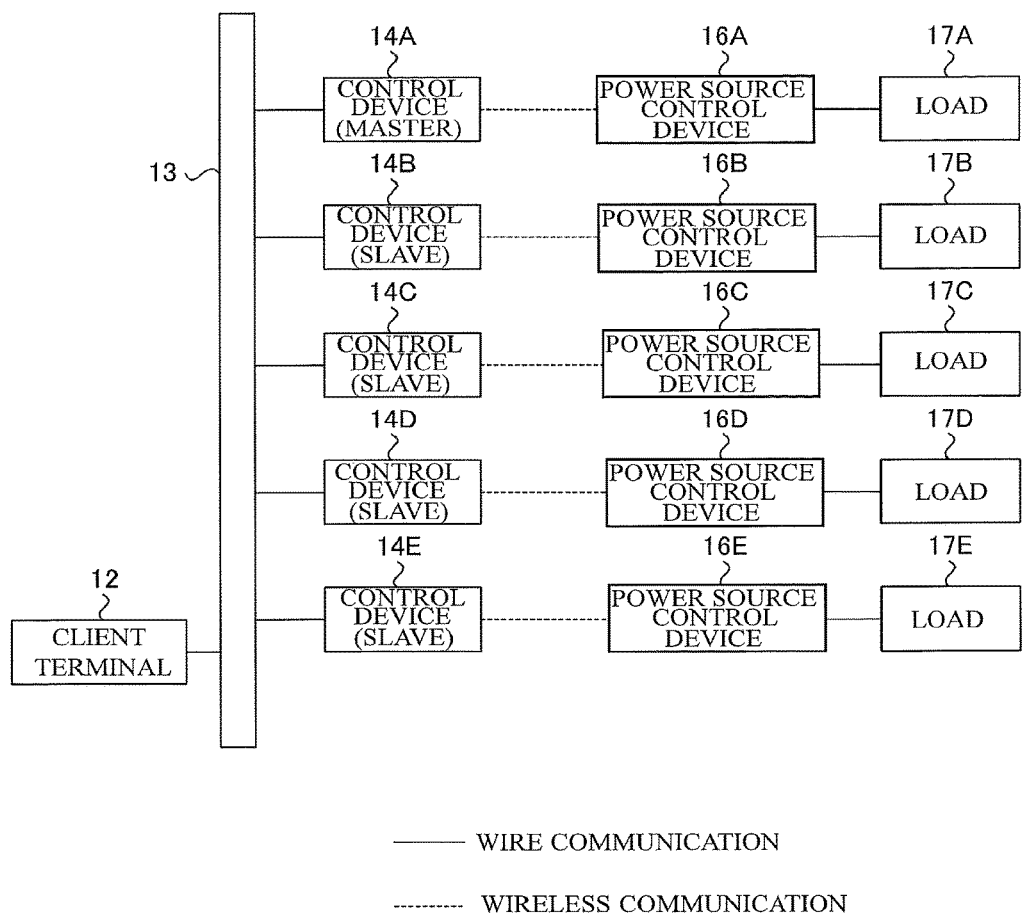
FIG. 2 illustrates a structure diagram of a communication system in accordance with an embodiment.

FIG. 2 illustrates a structure diagram of a communication system in accordance with an embodiment. As illustrated in FIG. 2, a communication system 11 has a client terminal 12 and control devices 14A to 14E. The client terminal 12 is connected to the control devices 14A to 14E via a wired network 13 (for example, a LAN). The control devices 14A to 14E have a function as a wireless base device for respectively communicating with power source control devices 16A to 16E with wireless communication. The control devices 14A to 14E are respectively connected to the power source control devices 16A to 16E via wireless communication. The control devices 14A to 14E respectively acquire electrical power information from the power source control devices 16A to 16E acting as opposing control devices. The electrical power information is an example of possession information which the power source control devices 16A to 16E possess. The power source control devices 16A to 16E are respectively connected to loads 17A to 17E. The loads 17A to 17E are electrical appliances and are computers, mobile phones, refrigerators, televisions or the like.

Figure 3:
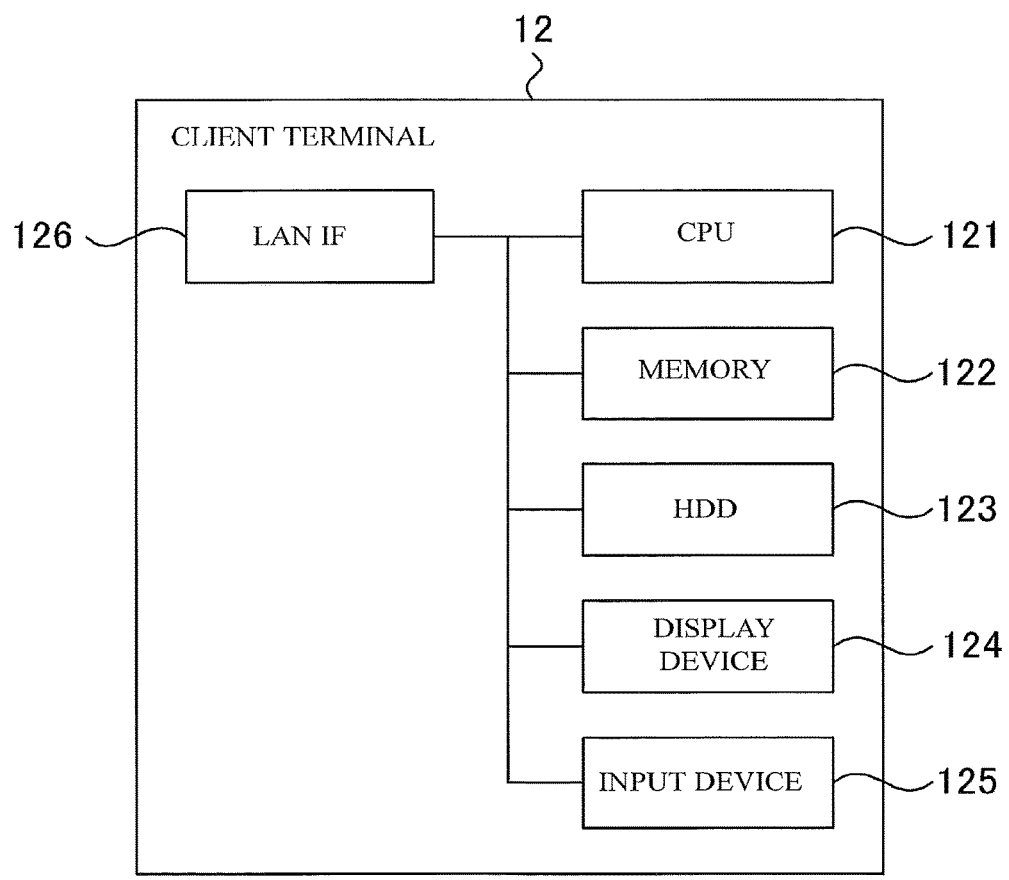
FIG. 3 illustrates a block diagram of a client terminal.

FIG. 3 illustrates a block diagram of the client terminal 12. The client terminal 12 is an information processing device and is a computer or the like. The client terminal 12 has a CPU 121 that controls a whole thereof, a memory 122 and a hard disk drive 123 that store a predetermined program or data, a display device 124 that shows a program or data, an input device 125 such as a key board or a mouse that inputs data, and a local area network interface (LAN IF) 126.

The hard disk drive 123 stores a setting program that makes one of the control devices 14A to 14E act as a master and makes the others act as slaves. The CPU 121 reads the setting program, writes the setting program in the memory 122, and executes the setting program. Thus, the CPU 121 makes one of the control devices 14A to 14E act as a master and makes the others act as slaves in accordance with an instruction from the input device 125. The setting of the master and the slaves can be changed through the input device 125. In the embodiment, the control device 14A is made to act as a master, and the control devices 14B to 14E are made to act as slaves. The LAN IF 126 is connected to the wired network 13 via a LAN cable.

Figure 4:
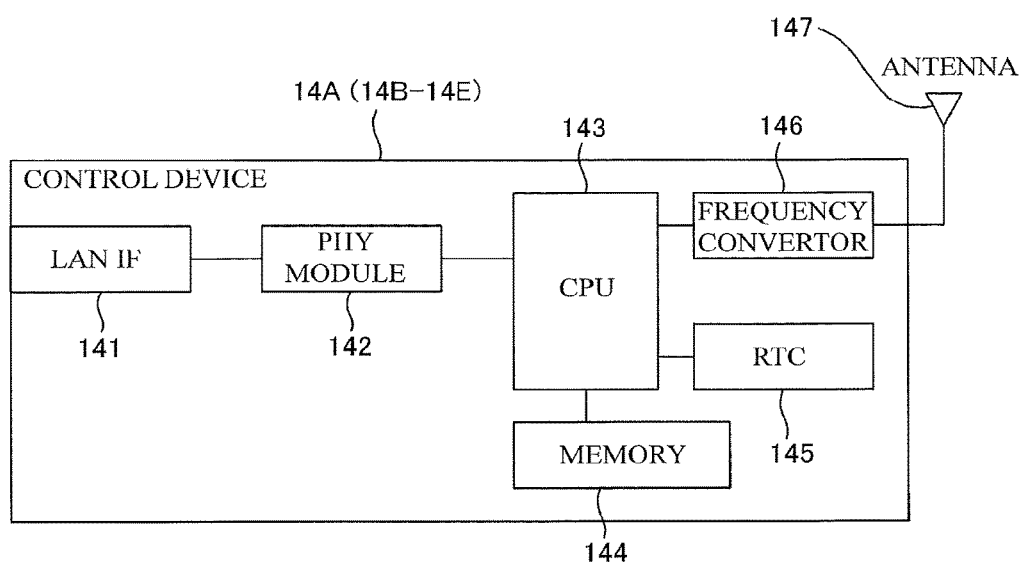
FIG. 4 illustrates a block diagram of a control device.
Figure 5:
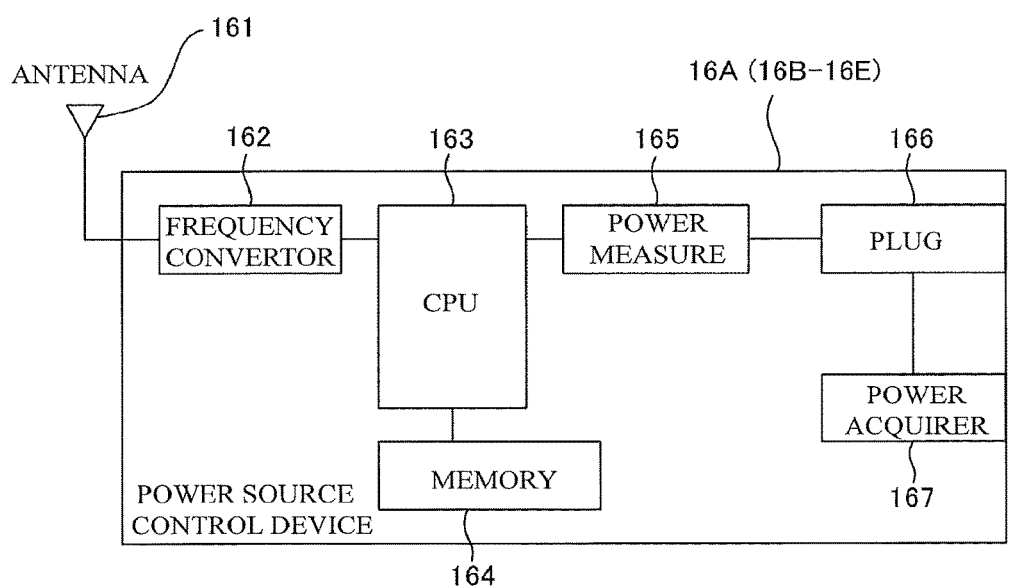
FIG. 5 illustrates a block diagram of a power source control device.

FIG. 4 illustrates a block diagram of a structure of the control device 14A. The control devices 14B to 14E have the same structure as the control device 14A. FIG. 5 illustrates a block diagram of a structure of the power source control device 16A. The power source control devices 16B to 16E have the same structure as the power source control device 16A.

The control device 14A of FIG. 4 has a local area network interface (LAN IF) 141, a PHY (Physical Layer Chip) module 142, a CPU 143, a memory 144, a built-in clock (real time clock; RTC) 145, a frequency convertor 146 and an antenna 147.

For example, the LAN IF 141 and the CPU 143 of the control device 14A acting as a master acts as an acquirer, a reporter and a sender. The CPU 143 of the master acts as a generator, for example. The frequency convertor 146, the antenna 147 and the CPU 143 of the master act as a second acquirer, for example. The memory 144 of the master acts as a holder, for example. Each CPU 143 of the control devices 14B to 14E acting as slaves acts as a changer, for example. The frequency convertor 146, the antenna 147 and the CPU 143 of the slaves act as a third acquirer, for example. The LAN IF 141 and the CPU 143 of the slaves act as a second sender, for example.

The power source control device 16A of FIG. 5 has an antenna 161, a frequency convertor 162, a CPU 163, a memory 164, an electrical power measure 165, a plug 166 and an electrical power acquirer 167.

In FIG. 4, the LAN IF 141 is connected to the wired network 13 via a LAN cable. The PHY module 142 performs a conversion between data and an electrical signal. The CPU 143 controls an entire operation of the control device. The memory 144 stores data, information and so on. The RTC 145 measures a time. The times of the control devices 14A to 14E are consistent with each other. The frequency convertor 146 changes a frequency band used for the communication with the power source control device 16A. The antenna 147 is used for sending information to the power source control device 16A or receiving information from the power source control device 16A.

In FIG. 5, the antenna 161 is used for sending information to the control device 14A or receiving information from the control device 14A. The frequency convertor 162 changes a frequency band used for the communication with the control device 14A. The CPU 163 controls an entire operation of the power source control device. The memory 164 stores data, information and so on. The electrical power measure 165 measures electrical power information of a load (load 17A) such as a consumption power, a consumption current or a voltage. The plug 166 supplies an electrical power to the connected load via the electrical power acquirer 167. The electrical power acquirer 167 is connected to an outer power source and acquires the electrical power supplied to the load from the outer power source.

The control device 14A and the power source control device 16A communicate with each other through wireless communication with use of the antennas 147 and 161 and the frequency convertors 146 and 162. The power source control device 16A supplies electrical power to the load connected to the plug 166 via the electrical power acquirer 167 and measures electrical power information of the load such as the consumption power, the consumption current or the voltage. The control devices 14A to 14E are connected to the client terminal 12 via the LAN IF 141 and the wired network 13 and communicate with each other with use of a http protocol. In the embodiment, a header or the like needed for the http protocol is omitted.

The power source control devices 16A to 16E respectively supply electrical power to the loads 17A to 17E and respectively measure electrical power [W] consumed by the loads 17A to 17E. The control devices 14A to 14E respectively perform wireless communication with the power source control devices 16A to 16E and respectively acquire the electrical power information from the power source control devices. The electrical power information is a value of the consumption power [W] of the load connected to each of the power source control devices. The electrical power information may be a value of the consumption voltage or the consumption current of the load connected to each of the power source control devices. Each memory 144 of the control devices 14A to 14E stores the electrical power information acquired thereby together with the time of the RTC 145.

FIG. 6 illustrates a relationship between the control devices 14A to 14E, IP addresses, the power source control devices 16A to 16E managed by the control devices, and group IDs to which the power source control devices belong.

The power source control devices 16A to 16E are classified as illustrated in FIG. 6. The power source control device 16A belongs to a group having a group ID "g0003". The power source control devices 16B and 16C belong to a group having a group ID "g0001". The power source control devices 16D and 16E belong to a group having a group ID "g0002".

The memory 144 of the control device 14A acting as a master stores information of the power source control device managed by the master, the group ID of the group to which the power source control device belongs, an IP address of the control device acting as a slave, information of the power source control device managed by each slave, and the group ID of the group to which the power source control device managed by each slave belongs. A name of each slave, an IP address of each slave, information of the power source control device managed by each slave, the ID of the group to which the power source control device managed by each slave belongs are associated with each other and are stored.

In concrete, the memory 144 of the control device 14A stores information of the power source control device 16A, the group ID "g0003" to which the power source control device 16A belongs, IP addresses "192. 168. 1. 12" to "192. 168. 1. 15" of the slaves, information of the power source control devices 16B to 16E managed by each slave, the group ID "g0001" to which the power source control devices 16B and 16C belong, and the group ID "g0002" to which the power source control devices 16D and 16E belong.

The memory 144 of each slave stores the IP address of the master. That is, the memories 144 of the control devices 14B to 14E acting as a slave stores the IP address "192. 168. 1. 11" of the master. A user registers the above-mentioned information in the master and each slave through the client terminal 12.

Figure 7:
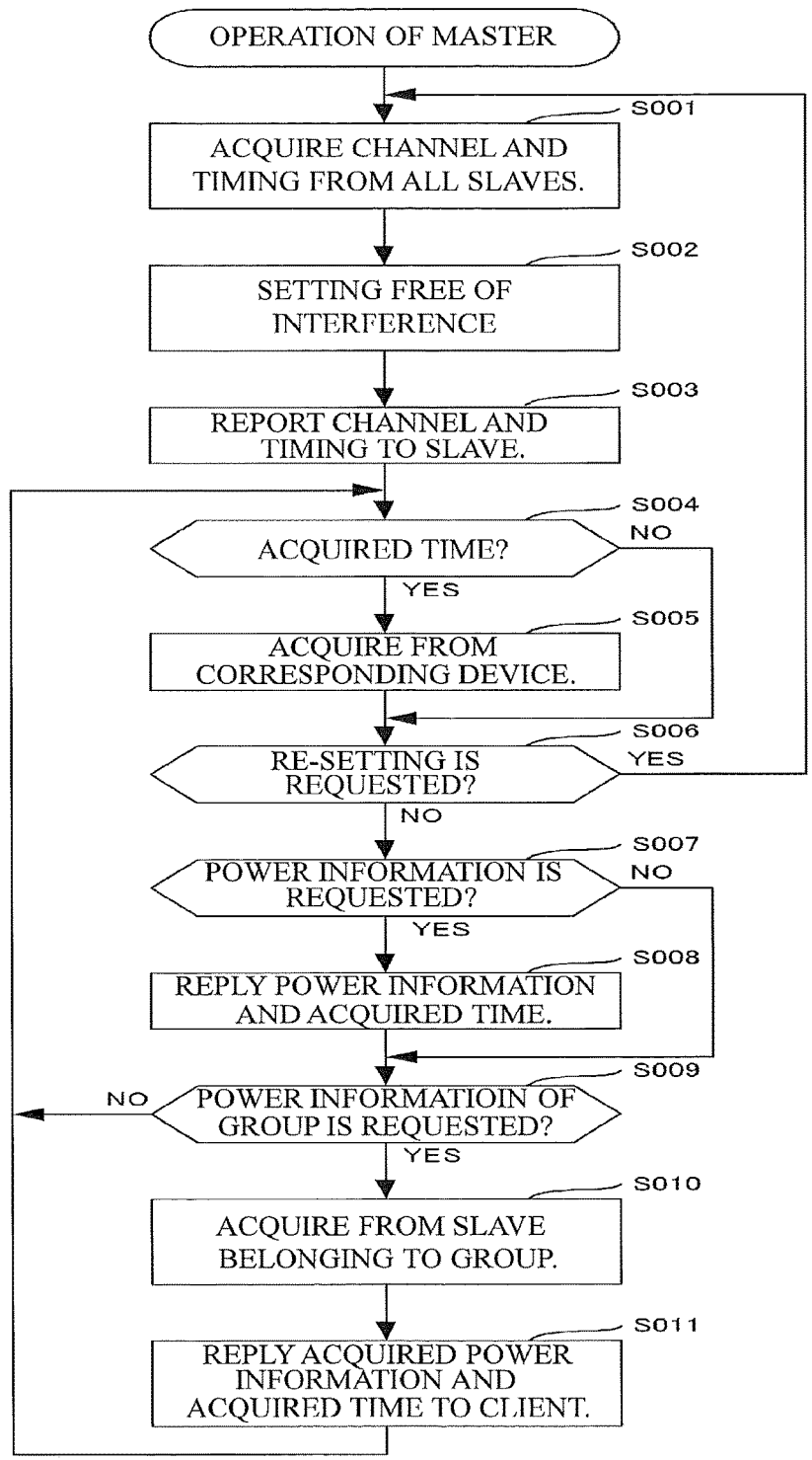
FIG. 7 illustrates a flow chart describing an operation of a control device (master)
Figure 8:
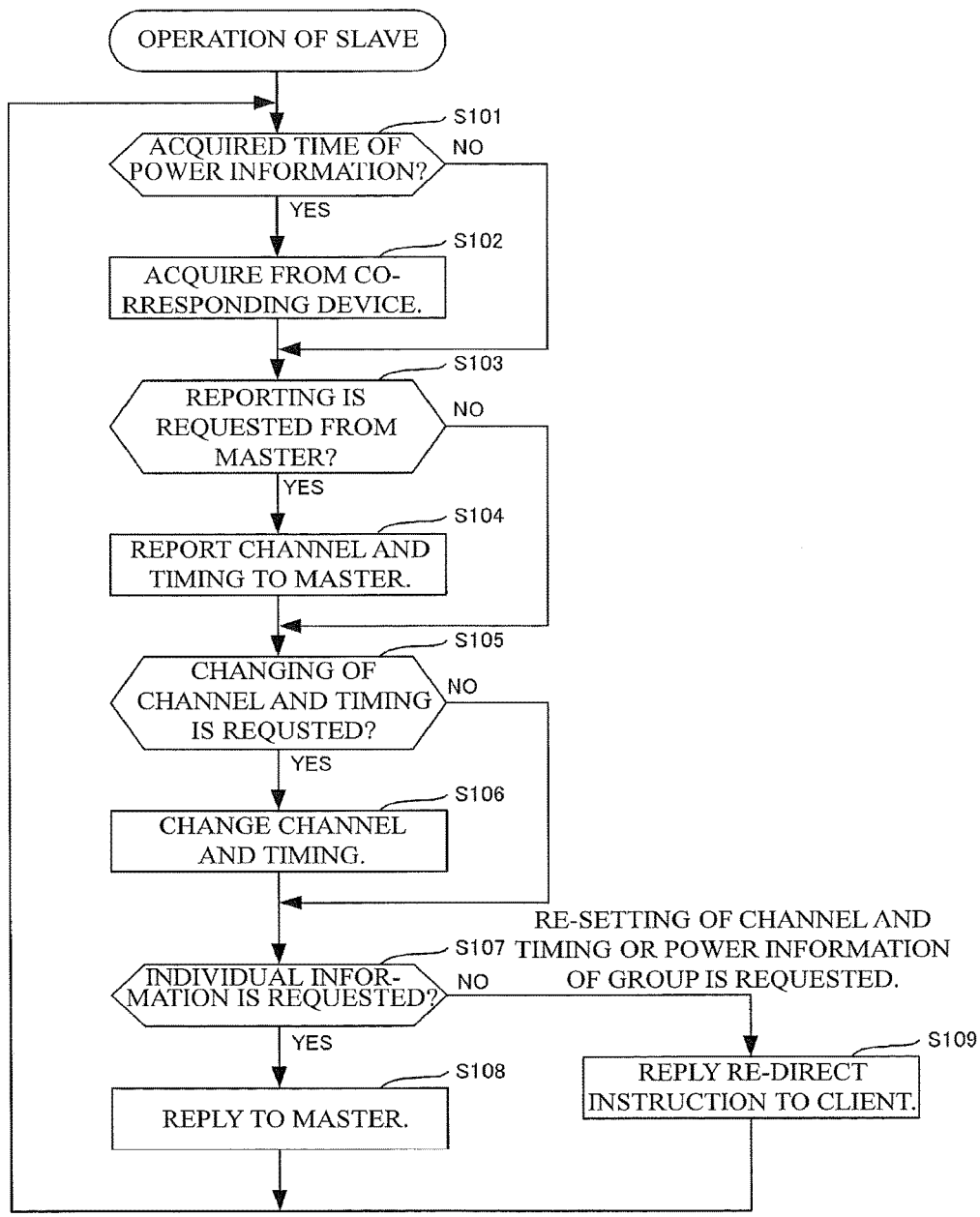
FIG. 8 illustrates a flow chart describing an operation of a control device (slave)

FIG. 7 illustrates a flowchart of an operation of the control device 14A (the master). FIG. 8 illustrates a flowchart of operations of the control devices 14B to 14E (the slaves). In this case, the control device 14A acts as the master, and the control devices 14B to 14E act as the slaves.

Just after starting of the communication system 11, the control devices 14A to 14E and the power source control devices 16A to 16E do not perform a negotiation in a frequency band at a communication timing used for wireless communication. Therefore, the control devices 14A to 14E and the power source control devices 16A to 16E may interfere with each other. The "frequency band" is a channel that is a frequency band needed for sending and receiving of data. The "communication timing" is a starting time and a cycle of wireless communication of each control device. The starting time and the cycle of the wireless communication is determined by the RTC 145 of each control device.

The control device 14A acting as the master changes the channel and the communication timing of the wireless communication among all of the control devices including the control device 14A and all of the power source control devices to another channel and another communication timing that are free of interference. The CPU 143 of the master acquires channels and communication timings used for the wireless communication from all slaves via the wired network 13 as the process (step S001 of FIG. 7). In concrete, the CPU 143 of the master sends a request (that is, a GET method) indicated by the following URL to the slaves. The URL is the request of the channel and the communication.

$$\text{http://<IP address of each slave>/nph.cgi/rfconfig.xml} \tag{1}$$

The CPU 143 of the slave that receiving the request reports a channel and a communication timing used by the CPU 143 to the master by sending the following http message (2) to the master via the wired network 13 (YES in step S103 and S104 of FIG. 8).

<channel>2</channel>

<start>5</start>

$$\text{<interval>10</interval>} \tag{2}$$

In the http message (2), the channel tag indicates the used channel. The start tag indicates a value in second at which the wireless communication starts. The interval tag indicates a value in second of the cycle of the wireless communication. In the above-mentioned example, the channel is 2, the value in second at which the wireless communication starts is 5, and the cycle is 10 seconds. When the value in second is 5 and the cycle is 10 seconds, the wireless communication starts at 5 seconds, 15 seconds, 25 seconds, 35 seconds, 45 seconds and 55 seconds in any one minute. The data transfer time of the wireless communication is 1 second in single wireless communication. A user can change the data transfer time of the wireless communication through the client terminal 12.

The CPU 143 of the master generates a setting that is free of interference of the wireless communication as illustrated in FIG. 9 based on the channels and the communication timings that are acquired by all slaves and are used for the wireless communication and the channel and the communication timing that the master uses in the wireless communication (step S002 of FIG. 7). FIG. 9 illustrates an example in which 4 channels can be used, starting time is 5 or 10

(initial value is 5), and the cycle is 10 seconds. The number of the channel, the starting time and the cycle are not limited to values of FIG. 9. In the case of FIG. 9, the cycle is fixed to 10 seconds. However, the cycle may be changed unless interference occurs in the wireless communication. In FIG. 9, the control devices 14A, 14B, 14C and 14D use channels that are different from each other. Therefore, the starting times of the control devices may be set to an identical value (for example, "5"). On the other hand, the control device 14E uses the channel 1 that is the same as the channel of the control device 14A. Therefore, a difference between the value in second of the starting time of the control device 14A and the starting time of the control device 14E is five seconds.

Figure 10:
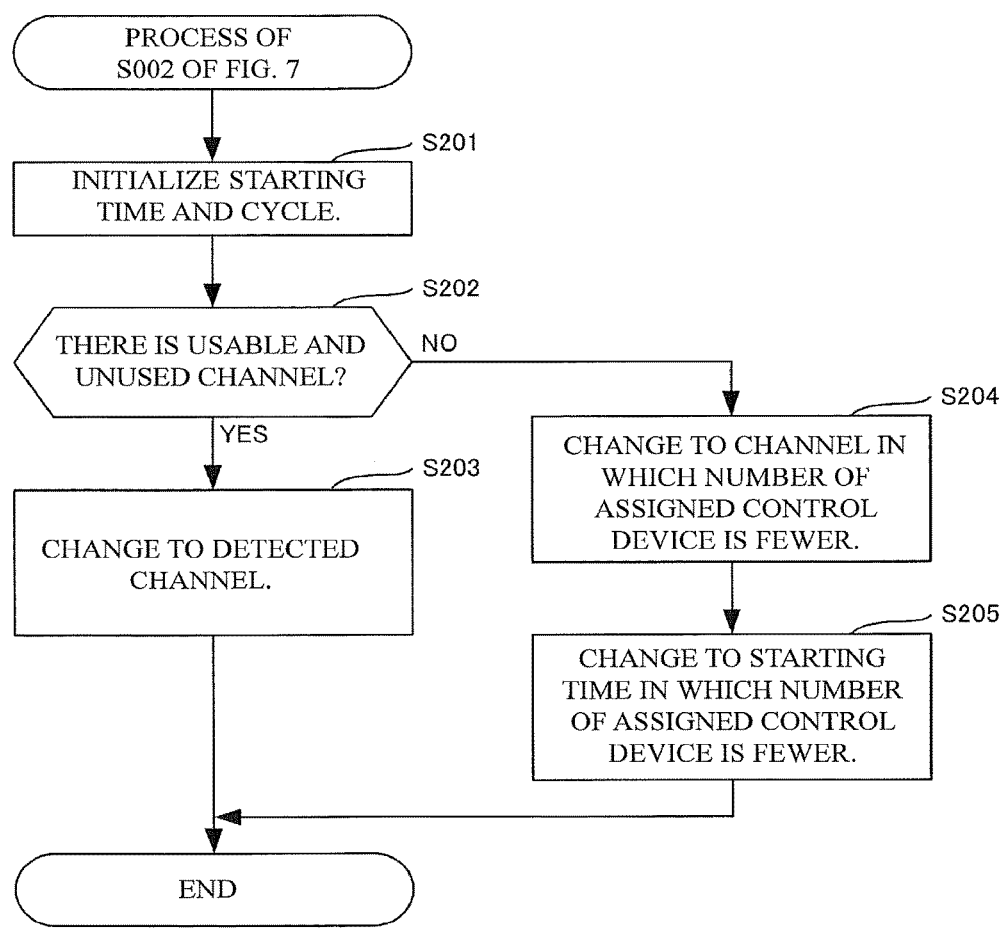
FIG. 10 illustrates a flowchart describing detailed processes of step S002 of FIG. 7.

The setting that is free of the interference of the wireless communication is generated. Therefore, the CPU 143 of the master performs the processes of FIG. 10 with respect to the wireless communication of all control devices. The processes of FIG. 10 is performed in the step S002 of FIG. 7. A description will be given of the processes of FIG. 10.

The CPU 143 of the master initializes the starting times and the cycles of the wireless communication (step S201). An initial value of the starting time of each control device is set to 5, and the cycle is set to 10 seconds. Next, it is determined whether the CPU 143 of the master can be used, and there is an unused channel (step S202). When it is determined as "YES" in the step S202, the CPU 143 of the master changes the channel used by an object control device to a detected channel that can be used and is not used (step S203), and the process is terminated.

When it is determined as "NO" in the step S202, the CPU 143 of the master changes the channel used by the object control device to another channel in which the number of the assigned control devices is fewer (step S204). Moreover, the CPU 143 of the master changes the starting time of the wireless communication of the object control device to another starting time in which the number of the assigned control devices is fewer (step S205), and terminates the process.

For example, when the channel of the control device 14B acting as a slave is determined, the channel that the control device 14A uses is already determined as the channel 1. However, the channels 2 to 4 are usable and unused. Therefore, in this case, the channel used by the control device 14B is changed to the channel 2. For example, when the channel of the control device 14E acting as a slave is determined, the channels 1 to 4 are already assigned to the control devices 14A to 14D. Therefore, in the step S202, it is determined that there are no usable and unused channels. In this case, the CPU 143 of the master changes the channel used by the control device 14E to another channel in which the number of assigned channels is fewer (step S204). In FIG. 9, the channels 1 to 4 are assigned to the control devices 14A to 14D. Therefore, the channel in which the number of the assigned control devices is fewer is one of the channels 1 to 4. Moreover, the CPU 143 of the master changes the starting time of the wireless communication to another starting time (that is, 10 seconds) in which the number of the assigned control devices is fewer (step S205).

With the processes of FIG. 10, the setting that is free of interference of the wireless communication (that is, channels and communication timings) can be assigned to all control devices. In the step S205, the starting time of the wireless communication is changed. However, unless interfere occurs in the wireless communication, the cycle may be changed instead of the starting time of the wireless communication or in addition to the starting time of the wireless communication.

As illustrated in FIG. 7, the CPU 143 of the master reports the channel and the communication timing of each wireless communication with the following URL request (3) to each slave via the wired network 13 (step S003 of FIG. 7).

http://<IP address of each slave>/
    nph.cgi?channel=2&start=5&interval=10     (3)

When the slave receives the above-mentioned URL request (3), that is, when the master requests the changing of the channel and the communication timing of the wireless communication (YES in step S105 of FIG. 8), the slave changes the channel and the communication timing of the wireless communication thereof in accordance with the URL request (3) (step S106 of FIG. 8). For example, in the control device 14B of FIG. 9, the channel is changed from the initial value to 2, the value in second of the starting time of the wireless communication is changed from the initial value to 5, and the cycle is changed from the initial value to 10 seconds. When each initial value is not changed, the initial values are kept.

Each control device acquires electrical power information from the corresponding power source control device via wireless communication using the above-set channel after it is confirmed that the RTC 145 indicates the time designated by the above-mentioned communication timing (step S004 and S005 of FIG. 7 and step S101 and step S102 of FIG. 8). In the step S005 of FIG. 7, the master acquires the electrical power information from the power source control device (in this case, the power source control device 16A) performing the wireless communication. In the step S102 of FIG. 8, the slave acquires the electrical power information from the power source control device that performs the wireless communication with the slave.

When the channel and the communication timing used for the wireless communication are re-set by adding a slave or deleting a slave, the client terminal 12 requests a re-setting of the channel used for the wireless communication and the communication timing from the master with use of the following URL request.

http://<IP address of master>/nph.cgi/dorfconfig=1     (4)

The CPU 143 of the master receiving the above-mentioned URL request (4) re-sets the channel and the communication timing used for all of wireless communication (YES in step S006 of FIG. 7). In this case, the acquiring of a channel and a communication timing used for wireless communication (step S001), the generating of a setting of a channel and communication timing that is free of interference of wireless communication (step S002) and the reporting of a generated channel and a generated communication timing to each slave (step S003) are performed again.

The user requests the electrical power information of the corresponding power source control device from each control device with use of the client terminal 12. The clients terminal 12 requests the electrical power information from each control device with use of the following URL request (5).

http://<IP address of control device>/nph.cgi/data.csv     (5)

The CPU 143 of the control device receiving the above-mentioned URL request (5) replies the electrical power information and the acquired time of the electrical power information stored therein to the client terminal 12 as illustrated in FIG. 11 (step S007 and S008 of FIG. 7 and step S107 and S108 of FIG. 8).

The user can request the electrical power information of every group from the master with use of the client terminal 12. For example, the client terminal 12 requests the electrical power information of the power source control device belonging to the group ID "g0001" with use of the following URL request (6) from the master.

http://<IP address of master>/nph.cgi/g0001_data.csv (6)

When the CPU 143 of the master receives the above-mentioned URL request (6), that is, when the electrical power information of the power source control device belonging to the group of the client terminal 12 is requested (YES in step S009 of FIG. 7), the CPU 143 of the master uses the following URL requests (7) and (8), requests the electrical power information and an acquired time of the electrical power information from all slaves managing the power source control device belonging to the group thereof and acquires the electrical power information and the acquired time (step S010 of FIG. 7). When there are a plurality of slaves, the CPU 143 of the master requests the electrical power information and the acquired time of the electrical power information from the slaves in order and acquires the electrical power information and the acquired time. In this case, all slaves that manage the power source control devices belonging to the group ID "g0001" are the control devices 14B and 14C of FIG. 6.

http://<IP address of control the device 14B>/nph-.cgi/data.csv (7)

http://<IP address of control the device 14C>/nph-.cgi/data.csv (8)

The CPU 143 of the slave that receives the URL requests (7) and (8) replies the electrical power information and the acquired time of the electrical power information stored therein to the master (step S107 and step S108 of FIG. 8). After that, the master replies the acquired electrical power information and the acquired time of the electrical power information to the client terminal 12 (step S011 of FIG. 7).

On the other hand, when the user requests "re-setting of the channel and the communication timing used by the control device in the wireless communication" or "the electrical power information of every group" from the slave through the client terminal 12 (NO in step S107 of FIG. 8), the CPU 143 of the slave uses the known IP address of the master and replies a re-direct instruction requesting "re-setting of the channel and the communication timing used by the control devices in the wireless communication" or "the electrical power information of every group" from the master to the client terminal 12 (step S109 of FIG. 8).

When the electrical power information of the power source control devices are replied to the client terminal 12, the user sets a response format to the master in advance through the client terminal 12. FIG. 12 illustrates an example of the format of the electrical power information acquired from the power source control devices 16A and 16B.

Figure 13:
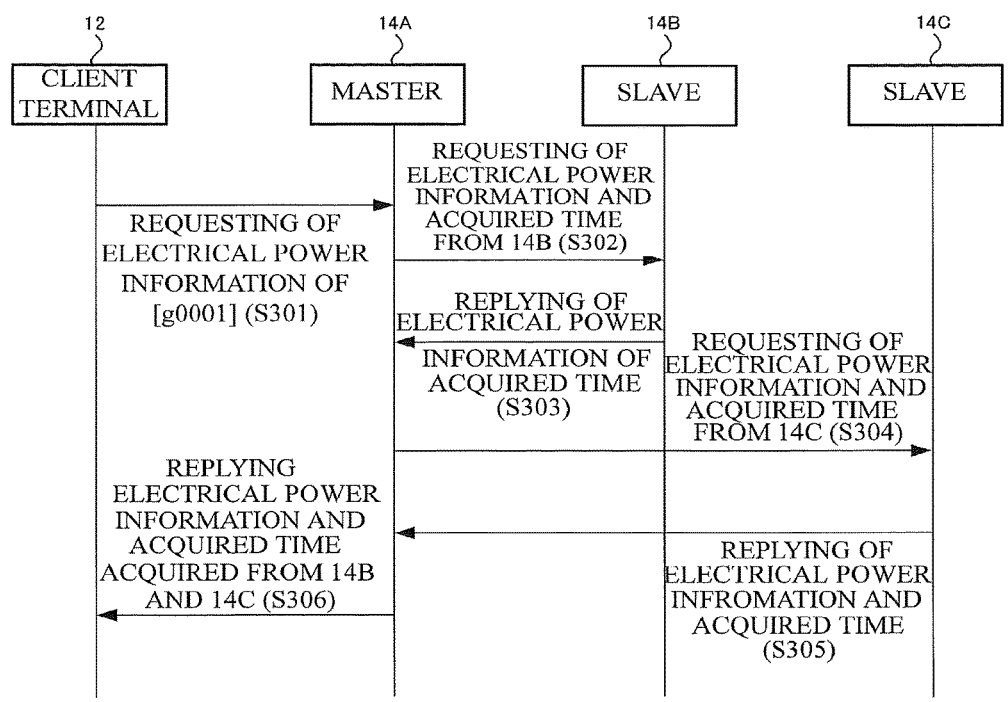
FIG. 13 illustrates a sequence diagram describing a process for acquiring electrical power information of a power source control device belonging to a group ID "g0001"

FIG. 13 illustrates a sequence diagram describing processes for acquiring the electrical power information of the power source control devices belonging to the group ID "g0001".

The client terminal 12 requests electrical power information of the power source control devices belonging to the group ID "g0001" from the master (the control device 14A) (step S301). In this case, the client terminal 12 sends the above-mentioned URL request (6) to the master.

The CPU 143 of the master requests the electrical power information and the acquired time of the electrical power information to the slave (the control device 14B) that manages the power source control device 16B belonging to the group ID "g0001" (step S302). In this case, the CPU 143 of the master sends the above-mentioned URL request (7) to the slave (the control device 14B). The CPU 143 of the slave (the control device 14B) sends the electrical power information and the acquired time of the electrical power information stored therein to the master (step S303). In concrete, the CPU 143 of the slave (the control device 14B) replies the electrical power information and the acquired time of the electrical power information to the master.

Next, the CPU 143 of the master requests the electrical power information and the acquired time of the electrical power information from the slave (the control device 14C) that manages the power source control device 16C belonging to the group ID "g0001" (step S304). In this case, the CPU 143 of the master sends the above-mentioned URL request (8) to the slave (the control device 14C). The CPU 143 of the slave (the control device 14C) replies the electrical power information and the acquired time of the electrical power information stored therein to the master (step S305). In concrete, the CPU 143 of the slave (the control device 14C) replies the electrical power information and the acquired time of the electrical power information acquired from the power source control device 16C to the master.

The CPU 143 of the master replies the electrical power information and the acquired time of the electrical power information acquired from the slave (the control devices 14B and 14C) to the client terminal 12 (step S306).

Figure 14:
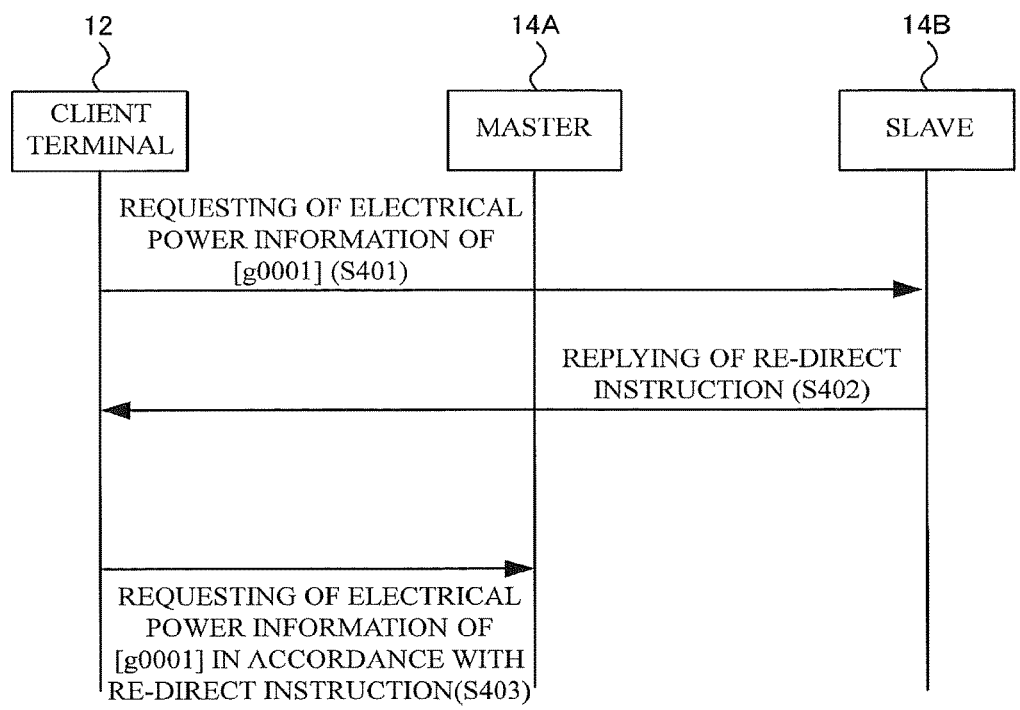
FIG. 14 illustrates a sequence diagram describing a process in a case where a client terminal requests electrical power information of a power source control device belonging to a group ID "g001" from a slave.

FIG. 14 illustrates a sequence diagram describing processes in a case where the client terminal 12 requests the electrical power information of the power source control devices belonging to the group ID "g0001" from the slave (the control device 14B).

The client terminal 12 requests the electrical power information of the power source control devices belonging to the group ID "g0001" from the slave (the control device 14B) (step S401). In this case, the client terminal 12 sends the following URL request (9) to the slave (the control device 14B).

http://<IP address of the control device 14B>/nph-.cgi/g0001_data.csv (9)

The CPU 143 of the slave (the control device 14B) uses the known IP address of the master and replies a re-direct instruction (10) requesting the electrical power information of the group ID "g0001" from the master to the client terminal 12 (step S402). For example, the re-direct instruction (10) is the following instruction.

Location:http://<IP address of master>/nph.cgi/g0001_data.csv (10)

After that, the client terminal 12 requests the electrical power information of the power source control devices belonging to the group ID "g0001" from the master (step S403). In this case, the client terminal 12 sends the following URL request (11) to the master.

http://<IP address of master>/nph.cgi/g0001_data.csv (11)

With the processes of FIG. 14, even if the user requests the electrical power information of the power source control device belonging to an arbitrary group ID from the slave, the user re-requests the electrical power information from the master. Therefore, the user can get an expected result. In other words, requests that the slave cannot handle can be introduced to the master that is a correct request destination.

As mentioned above, in the embodiment, the CPU 143 of the control device 14A acting as the master acquires the information relating to the channels and the communication timing used for the wireless communication from the control devices 14B to 14E that are made to act as the slaves via the wired network 13 (step S001). The CPU 143 generates settings of the channel and the communication timing that are free of interference of the wireless communication between the control devices 14A to 14E and the power source control devices 16A to 16E based on information relating to the channel and the communication timing used by the master in the wireless communication and the acquired information relating to the channel and the communication timing used for the wireless communication (step S002). And, the CPU 143 reports the generated settings of the channel and the communication timing to the control devices 14B to 14E that are made to act as the slaves via the wired network 13 (step S003). Therefore, when a plurality of control devices perform wireless communication with a plurality of power source control devices, a channel and a communication timing that are free of interference of the wireless communication are automatically set in the plurality of control devices (a master and slaves). It is therefore possible to suppress interference of the wireless communication without a load of a user.

When a slave is added or deleted (YES in step S006), information relating to the channel and the communication timing is acquired again (step S001). And, a setting of the channel and the communication timing that are free of interference of the wireless communication is generated again (step S002). And, the setting of the re-generated channel and the re-generated communication timing are reported to the slaves again (step S003). It is therefore possible to prevent the interference of the wireless communication when a slave is added or deleted.

And, when the client terminal 12 connected to the master via the wired network 13 requests the electrical power information from the master (YES in step S007), the master acquires the electrical power information from the power source control devices that perform wireless communication with the master (step S005). And, the master sends the acquired electrical power information to the client terminal 12 (step S008). It is therefore possible to send the electrical power information of the power source control devices performing the wireless communication with the master to the client terminal 12.

Moreover, the master has the memory 144 that associates IP addresses (destinations) of the slaves with information of the power source control devices managed by the slaves, and an ID of a group to which the power source control devices managed by the slaves belong and stores them. When the client terminal 12 requests the electrical power information of the power source control devices belonging to a group from the master (step S009), the CPU 143 of the master acquires the electrical power information of the power source control devices belonging to the group from the slaves managing the power source control devices belonging to the group (step S010), and sends the acquired electrical power information to the client terminal 12 (step S011). It is therefore possible to send electrical power information of the power source control devices belonging to the group that is managed by the slaves to the client terminal 12.

In the embodiment, the control devices 14A to 14E are respectively connected to the power source control devices 16A to 16E via wireless communication and respectively acquire electrical power information from the power source control devices 16A to 16E. However, connection destinations of the control devices 14A to 14E are not limited to the power source control devices 16A to 16E and may be a computer or a home electronics that are capable of performing wireless communication with the control devices 14A to 14E. The information which the control devices 14A to 14E acquire from the connection destinations is not limited to electrical power information and may be property information (such as a date of packing, a model number, or a product name) of the connection destinations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A control device that performs wireless communication and is connected to another control device via a wired network comprising:
   a memory; and
   a processor coupled to the memory and the processor configured to:
   acquire information relating to a channel and a communication timing used for wireless communication via the wired network from another control device that is made to act as a slave;
   generate a setting of a channel and a communication timing in which no interference occurs between wireless communication with a first opposing control device performed by the control device and wireless communication with a second opposing control device performed by the another control device, based on information relating to a channel and a communication timing used for wireless communication of the control device and the acquired information relating to the channel and the communication timing used for wireless communication of the another control device; and
   report the generated setting of the channel and the timing to the another control device that is made to act as the slave via the wired network for minimizing interference in communication between the control devices and corresponding opposing control devices,
   wherein:
   the memory holds information on a first relationship between the control device and the first opposing control device managed by the control device and a second relationship between the another control device and the second opposing control device managed by the another control device,
   the processor is further configured to:
   acquire a first electrical power information of a first load connected to the first opposing control device from the first opposing control device according to the first relationship,
   acquire a second electrical power information of a second load connected to the second opposing control device from the another control device according to the second relationship when the second electrical power information is requested from an information processing device connected to the control device via the wired network, and send the first electrical power information and the second electrical power information to the information processing device for displaying the respective electrical power information to a user for corrective action by the user.

2. The control device as claimed in claim 1, wherein:
the communication timing is a starting time and a cycle of wireless communication;
when there is a usable and unused channel when generating the setting, the processor sets a channel that is used by an object control device to the usable and unused channel; and
when there is no usable and unused channel when generating the setting, the processor sets the channel that is used by the object control device to a channel in which a number of assigned control devices is less and sets a starting time of the wireless communication to a starting time in which a number of assigned control devices is less.

3. The control device as claimed in claim 1, wherein when the another control device is added to the wired network or is deleted from the wired network, the processor re-acquires the information relating to the channel and the communication timing from the another control device connected to the wired network, the processor re-generates the setting of the channel and the communication timing in which no interference occurs between wireless communication performed by the control device and wireless communication performed by the another control device, and the processor re-reports the re-generated setting of the channel and the communication timing to the another control device that is made to act as the slave.

4. The control device as claimed in claim 1, wherein the memory that associates with each other a destination of the slave, information of the second opposing control device managed by the slave, and information of a group to which the second opposing control device managed by the slave belongs, and holds the associated information,
when the second electrical power information of the second opposing control device belonging to the group indicated by the information processing device is requested, the processor acquires the second electrical power information of the second opposing control device belonging to the group from a slave that manages the second opposing control device belonging to the group.

5. A communication system comprising:
a plurality of control devices that are connected to each other via a wired network;
a plurality of opposing control devices that respectively perform wireless communication with the plurality of control devices; and
an information processing device that is connected to the plurality of control devices via the wired network, and includes a setter that makes one of the plurality of control devices act as a master and makes the other control devices act as a slave,
wherein:
the master comprises:
a memory that holds information on relationships between the plurality of control devices and the plurality of opposing control devices managed by the plurality of control devices respectively; and
a first processor, coupled to the memory, configured to:
acquire information relating to a channel and a communication timing used for wireless communication via the wired network from the slave;
generate a setting of a channel and a communication timing in which no interference occurs between wireless communication with the first opposing control device of the plurality of opposing control devices performed by the master and wireless communication with the second opposing control device of the plurality of opposing control devices performed by the slave, based on information relating to a channel and a communication timing used for wireless communication of the master and the acquired information relating to the channel and the communication timing used for wireless communication of the slave; and
report the generated setting of the channel and the communication timing to the slave via the wired network for minimizing interference in communication between the control devices and corresponding opposing control devices,
the slave comprises a second processor that changes a channel and a communication timing used for wireless communication of the slave in accordance with the reported setting of the channel and the communication,
the first processor is further configured to:
acquire a first electrical power information of a first load connected to the first opposing control device from the first opposing control device according to the relationships,
acquire a second electrical power information of a second load connected to the second opposing control device from the slave according to the relationships when the second electrical power information is requested from the information processing device,
and send the first electrical power information and the second electrical power information to the information processing device for displaying the respective electrical power information to a user for corrective action by the user.

6. The communication system as claimed in claim 5, wherein:
the communication timing is a starting time and a cycle of a wireless communication;
when there is a usable and unused channel when generating the setting, the first processor sets a channel that is used by an object control device to the usable and unused channel; and
when there is no usable and unused channel when generating the setting, the first processor sets the channel that is used by the object control device to a channel in which a number of assigned control devices is less and sets a starting time of the wireless communication to a starting time in which a number of assigned control devices is less.

7. The communication system as claimed in claim 5, wherein when the slave is added to the wired network or is deleted from the wired network, the first processor re-acquires the information relating to the channel and the communication timing from another slave connected to the wired network, the first processor re-generates the setting of the channel and the communication timing in which no interference occurs between wireless communication with the first opposing control device performed by the master and wireless communication with the second opposing control device performed by the slave, and the first processor re-reports the re-generated setting of the channel and the communication timing to other control devices that is made to act as the slave.

8. The communication system as claimed in claim 5, wherein:

the memory associates with each other a destination of the slave, information of the second opposing control device managed by the slave, and information of a group to which the second opposing control device managed by the slave belongs, and holds the associated information, when the second electrical power information of the second opposing control device belonging to a group indicated by the information processing device is requested, the first processor acquires the second electrical power information of the second opposing control device belonging to the group from the slave that manages the second opposing control device belonging to the group.

9. The communication system as claimed in claim 8, wherein when the information processing device requests a re-setting of the channel and the communication timing used for the wireless communication or the second electrical power information of the second opposing control device belonging to the group from the slave, the second processor of the slave sends back to the information processing device a re-direct instruction requesting the resetting of the channel and the communication timing used for the wireless communication or the second electrical power information of the second opposing control device belonging to the group from the master by using a destination of the master.

* * * * *